United States Patent Office 3,490,919
Patented Jan. 20, 1970

---

3,490,919
FATTY EMULSIONS AND THEIR PREPARATION
David P. J. Moran, Potters Bar, Middlesex, England, assignor to Lever Brothers Company, New York, N.Y., a corporation of Maine
No Drawing. Filed Mar. 23, 1965, Ser. No. 442,201
Claims priority, application Great Britain, Mar. 25, 1964, 12,667/64
Int. Cl. A23d 3/00
U.S. Cl. 99—123               20 Claims

ABSTRACT OF THE DISCLOSURE

Emulsions of edible fats, such as margarines, having a semi-solid plastic fat as a continuous phase and a stabilized dispersion of liquid oil in an aqueous medium as the disperse phase.

---

This invention relates to fatty foodstuffs, such as margarine, which are emulsions of water and oil.

In this specification the terms "oil" and "fat" are used synonymously.

Conventional margarine is a normally solid emulsion of oil and water which consists of between 15 and 20% by weight in an aqueous phase dispersed in the continuous fat phase (that is it is a so called "water-in-oil emulsion") the aqueous phase amounting to between 15 and 20% of the total weight. The physical properties and to some extent the organoleptic properties of these water-in-oil emulsions are largely determined by the composition of the continuous and homogeneously constituted fatty phase, thus greatly limiting the choice and/or quantities of the components.

The present invention provides a new kind of normally solid emulsion of oil and water, comprising a continuous phase of semi-solid fat and a disperse phase which is itself a stabilised dispersion of a liquid oil in an aqueous medium. By a semi-solid fat is meant one having the melting characteristics of butter-fat or margarine fat and preferably having a slip-melting point of about 32 to 35° C. The stabilisation is preferably effected by incorporation within the aqueous phase of a protective colloid.

The novel emulsions of the invention may be made by dispersing the liquid oil in an aqueous phase, homogenising the dispersion thus obtained to a suitably small particle size, blending the dispersion into a fat mixture which may be partially crystallised, and submitting the blend thus obtained, appropriately stabilised, to chilling and subsequent tempering.

One way of carrying out the method according to the invention comprises dispersing an oil which is to remain substantially liquid throughout the shelf-life of the product at atmospheric temperature (in an amount which may range from a few percent up to about 65% by weight of the oil-in-water emulsion to be prepared), in an aqueous phase in the presence of such adjuvants as are required to stabilise the emulsion, including a sequestering agent for calcium ions, preferably at a temperature of about 55 to 60° C., homogenising the oil-in-water emulsion thus obtained to a particle size of the oil of about 0.5 to about 1 micron followed by the treatment of the homogenised dispersion as described above.

Of the adjuvants required to stabilise the emulsion casein is particularly valuable but other protective colloids especially those of a proteinaceous nature, for example soyabean protein and gelatin may also be used. The casein may be acid precipitated casein or sodium caseinate. The casein may also be made in situ from skimmed milk or skimmed milk powder. Mention may also be made of colloidal carbohydrates and their derivatives such as water soluble alginate and gums, carboxy methyl cellulose and other water soluble cellulose ethers. Proteinaceous protective colloids such as casein give maximum stability, and are particularly important for those oil-in-water emulsions containing 50 to 65% by weight of fat. It is of particular advantage to employ casein in admixture with a smaller proportion of gelatin, say 2 to 10% of casein and 0.5 to 1 or 2% of gelatin, based on the weight of water. The adjuvant may include an emulsifier for instance mono- and/or diglyceride of stearic and/or other higher fatty acids, fatty acid esters of polyglycerol, partial fatty acid esters of polyhydric alcohol anhydrides, and partial fatty acid polyalkylene esters of polyhydric alcohol anhydrides.

The aqueous phase containing the required adjuvants is preferably prepared by dissolving a suitable sequestering agent in water or skimmed milk so that the pH is about 10, then adding a protective colloid with or without an emulsifier and subsequently adjusting the pH to about 5 to 7. Suitable sequestering agents are, for example, trisodium citrate and especially sodium tripolyphosphate. Preferably the sequestering agent is incorporated in an amount of about 1 to 5%, the total protein in an amount of about 5 to 10 or 15%, and the emulsifier in an amount of 0 to about 2%, all these percentages being by weight of the resulting aqueous phase. The adjustment of the pH may be carried out, for example, by adding the required amount of citric acid or sorbic acid, these acids also contributing to the bacteriological stability of the final product.

The partially crystallised fat mixture into which the homogenised oil-in-water dispersion is blended preferably contains about 0.5 to about 1% by weight of an edible emulsifier such as for example lecithin. Since this fat mixture eventually forms the outer fat phase it should preferably have a slip melting point slightly below the temperature of the mouth, most preferably about 32 to 35° C. The fat mixture should preferably be partially crystallised when blending in the oil-in-water dispersion and the temperature of said fat mixtures, depending on its slip melting point, should be maintained at about 30 to 32° C.

If desired, salt may be added during the preparation. In order to achieve a homogeneous distribution it is preferably incorporated in small amounts in the aqueous phase. Margarine according to the invention requires less salt than conventional margarine.

In a typical product of the invention the disperse phase is an oil-in-water emulsion comprising from about 30 to about 65% by weight of oil in substantially liquid state, protein in an amount of about 10 to 15% by weight of the aqueous phase and/or a sequestering agent in an amount of about 1 to 5% by weight of the aqueous phase, the particle size in said oil-in-water emulsion being substantially from about 0.5 to 1.0 micron, the continuous phase being a margarine fat of slip melting point 32 to 35° C.

The normally liquid oil may be one containing a relatively high proportion of polyunsaturated fatty acid groups as is found in linoleic acid, for example, sunflower oil or safflower oil. For biological reasons such oils are highly valued by selecting as continuous oil phase an oil composition having a satisfactory slip melting point no difficulty is encountered in making a product containing a high proportion of polyunsaturated oil which is stiff enough to be printed whereas a conventional product with an oil phase identical to the combined oil phases of such a product according to the invention would be too soft to be printed and would have to be filled in liquid condition into containers.

Certain fats for example rapeseed oil, which would otherwise be used in conventional margarine are sometimes regarded as unsatisfactory for such use owing to slight undesired flavour. According to the present invention such fats may be used in the inner fat phase without disadvantage.

The products of the invention also allow for the incorporation in the disperse oil phase of oil-soluble flavouring compounds and precursors thereof which provide a desirable flavour effect on cooking, but which in the same concentration at room temperature might be regarded as giving an undesirable flavour or taste to water-in-oil emulsions, such as conventional margarine. Products of this kind containing in the disperse oil phase one or more of such flavouring compounds and/or their precursors, show the advantage that, when using them as bread spreads, the disperse oil phase does not enter into contact so readily with the aroma-sensitive areas of the mouth, whereas on cooking the desired flavour is gradually released.

The flavouring compounds can be any of the oil-soluble compounds used to impart on cooking a butter flavour to margarine, such as, for example, the lactones of gamma- and delta-hydrocarboxylic acids, in particular those containing 10 to 14 carbon atoms, clove oil and phenylacetaldehyde.

Precursors of the flavouring compounds are, for example, esters of gamma- and delta-hydroxycarboxylic acids, in particular of those containing 10 to 14 carbon atoms.

The following examples illustrate the invention.

EXAMPLE 1

3 parts by weight of sodium tripolyphosphate were dissolved in 90 parts by weight of fresh skimmed milk containing about 3.5 parts by weight of protein, at a temperature of about 40° C., with moderate stirring. In this solution were dispersed, with agitation, 8 parts by weight of acid casein, thus bringing the total concentration of protein in the milk to about 12 parts. To this dispersion sufficient of a 60% solution of citric acid was added to lower the pH from about 7.2 to 6.0. After raising the temperature of this aqueous phase to about 65° C., 185 parts by weight of an oil phase, consisting of 74 parts of palm oil hardened to slip melting point 43° C. and 111 parts of ground nut oil, were gradually added with constant stirring and the resultant mixture was homogenised until the particle size of the oil phase was 0.5 to 1.0 micron, while maintaining the temperature at about 60° C. The resulting cream, after cooling to 30° C., was added in small amounts with continuous stirring at this temperature to 255 parts by weight of an oil phase consisting of 101 parts of lard randomised by interesterification and 152 parts of fish oil hardened to slip melting point 35° C. and 2 parts by weight of lecithin of the same temperature. The resulting cream-in-oil system was then passed successively through a premixer, a precrystallising unit, a Votator A-unit and a Votator B-unit ("Votator" is a registered trademark). The product leaving the B-unit had sufficient firmness to be readily formed into prints and packaged in a packaging machine.

EXAMPLE 2

In a modification of the process described in Example 1, in preparing the aqueous phase, 3 parts by weight of sodium tripolyphosphate were dissolved in a mixture of 20 parts by weight of butter serum and 80 parts by weight of fresh skimmed milk containing about 2.5 parts by weight of protein, at a temperature of about 40° C., with moderate stirring. In this solution were dispersed, with agitation, 8 parts by weight of acid casein, thus bringing the total concentration of protein in the dispersion to about 11 parts. To this dispersion sufficient of a 60% solution of citric acid was added to lower the pH from about 7.1 to about 6.0. After raising the temperature of this aqueous phase to about 60° C., 190 parts by weight of butter oil, were gradually added with constant stirring and the resultant mixture was homogenised until the particle size of the oil phase was 0.5 to 1.0 micron, while maintaining the temperature at about 60° C. The resulting cream was cooled to 30° C. and then added at said temperature in small amounts with continuous stirring to 335 parts by weight of butter oil and 5 parts by weight of lecithin of the same temperature, maintaining the temperature at 30° C. The resulting cream-in-oil system was then passed successively through a premixer, a precrystallising unit, a Votator A-unit and a Votator B-unit. The product leaving the B-unit had sufficient firmness to be readily formed into prints and packaged in a packaging machine.

EXAMPLE 3

The process described in Example 1 was repeated in the way described, except that the 185 parts of the first oil phase, which later formed the inner oil phase, contained $10^{-2}$ parts of phenylacetaldehyde.

Similar results may be obtained by using in the conventional way a churn and a cooling drum instead of a Votator A-unit and a Votator B-unit.

EXAMPLE 4

An aqueous phase was made up of:

| | Parts |
|---|---|
| Skim or sweet/sour milk | 87.8 |
| Acid casein | 7.0 |
| Sodium tripolyphosphate | 2.6 |
| Citric acid | 0.8 |
| Salt | 1.8 |
| | 100.0 |

The milk was heated to 40° C. and the polyphosphate dissolved in. To this solution the acid casein was slowly added with vigorous mixing, but avoiding aeration. Citric acid and salt were also included. The temperature was next increased to 65° C. and 185.7 parts of sunflower oil added portion-wise, with vigorous stirring, to effect partial emulsification.

After the completion of this addition the resultant oil in water cream was homogenised first at 500 p.s.i.g. then at 2500 or 3000 p.s.i.g. until the oil droplet size was reduced to an average of about one micron. The temperature was kept at 65° C., if necessary by heating the homogeniser.

The viscous cream was then cooled to 40° C. and placed in one tank of a Votator plant. Into a second tank was poured 265.4 parts of a fat blend obtained by interesterifying:

| | Parts |
|---|---|
| Sunflower oil | 132.7 |
| Palm oil hardened to slip point 58° C. | 39.8 |
| Coconut oil | 92.9 | and adding 3 parts of monoglycerides of lard at 70° C.

The fat blend from the second tank was fed to a Votator A-unit in which it was chilled to 25° C. Into the chilled fat flowing from this unit there was metered in the fat blend from the first tank in such proportions as to produce a mixture containing 16 to 20% of water. The mixture passed first to a precrystallising unit, where further crystallisation of the fat with agitation took place and then in turn through a further A-unit, in which it was chilled to 15° C., and a Votator B-unit to a packaging unit.

The product, in spite of its high total content of liquid fat, had a yield value of about 850 g./sq. cm., and could be packaged by the usual wrapping method.

EXAMPLE 5

The process of the previous example was repeated except that butter fat was substituted for the fat blend described.

EXAMPLE 6

The process was carried out as described in Example 4 except that safflower oil was substituted for sunflower oil.

EXAMPLE 7

The process was carried out as in Example 4 except that a blend of:

| | Parts |
|---|---|
| Palm stearin | 50 |
| Palm kernel oil | 20 |
| Sunflower oil | 30 | was used instead of the fat blend specified therein.

EXAMPLE 8

An aqueous phase was made by adding to fresh skimmed milk at 40° C. about 1% of sodium tripolyphosphate, 2% of salt, 1 to 2% of gelatin, 4 to 6% of precipitated casein (all based on the weight of the milk) and sufficient citric acid to give a final pH of 5.6. The ingredients were added one after the other taking care to effect complete solution at each stage but avoid aeration through too vigorous stirring. The temperature of the final solution was raised to 60 to 65° C. and a cream was made by emulsifying sunflower oil into the aqueous phase as in Example 4 and was homogenised as described therein.

The process was then continued as described in that example except that instead of injecting the cream into the fat blend which is to constitute the outer fat phase after that blend has been chilled by passage through a Votator A-unit, the cream was mixed into the fat blend at 40° C. in the pre-mix tank and the mixture was passed in turn through a precrystallising unit, an A-unit, from which it issues at 25° C. and a B-unit, to the packing machine.

It will be observed that Example 8 differs from the preceding examples in that the cream from which the aqueous phase is formed is mixed with the fat forming the continuous phase without pre-chilling that fat to effect partial crystallisation, the mixing being carried out at a temperature well above the slip-melting point of that fat. This has several advantages. It simplifies the plant necessary in that only one stage of Votator chilling is called for. This simplified process is even more easily controllable than that involving precrystallisation of the fat before introducing the cream. And it has been found in general to lead to firmer products, an advantage of special importance when the outer oil phase comprises a high proportion of polyunsaturated oil. To obtain this simplification we have found it very advantageous to use in stabilising the cream a mixture of casein with gelatin and it appears likely that this is essential to provide a stable process of the simplified nature described. The use of such a mixture, especially in the presence of a sequestering agent, for the purpose specified is thought to be broadly novel, as are emulsions comprising a continuous fat phase and a disperse phase which is an emulsion of fat in water so stabilised.

What is claimed is:

1. A plastic emulsified margarine product the continuous phase whereof consists essentially of a semi-solid edible fat and the disperse phase consists essentially of a homogeneous emulsion of a normally liquid edible fat distributed in the form of particles from about 0.5 to 1.0 micron in size in an aqueous medium in an amount of about 30% to about 65% by weight of the emulsion, the said aqueous medium containing effective amounts of a proteinaceous protective colloid as an emulsion stabilizer and a sequestering agent for calcium ions.

2. The composition according to claim 1 wherein the semi-solid fat has a slip melting point between 32–35° C.

3. A composition according to claim 1 wherein the total fat content amounts to 80–85% by weight and the disperse phase contains 30–65% of its weight of fat.

4. A composition according to claim 1 wherein the continuous phase contains about 2% by weight of a fat soluble emulsifier.

5. A composition according to claim 1 wherein the protective colloid comprises a stabilizer selected from the group consisting of casein and gelatin.

6. A composition according to claim 5 wherein the sequestering agent is an alkali metal citrate.

7. A composition according to claim 1 wherein the fat of the disperse phase contains a high proportion of linoleic acid.

8. A composition according to claim 7 wherein the fat of the disperse phase consists essentially of an edible oil selected from the group consisting of sunflower oil and safflower oil.

9. A composition according to claim 7 wherein the fat of the disperse phase consists essentially of soybean oil.

10. A composition according to claim 4 wherein the said emulsifier comprises lecithin.

11. A composition according to claim 1, wherein the fat of the disperse phase contains an effective amount of an oil soluble flavoring agent.

12. A composition according to claim 1, wherein the fat of the disperse phase contains an effective amount of a substance which when subjected to cooking temperatures develops a cooked-butter like flavor.

13. A composition according to claim 12, wherein said substance is phenylacetaldehyde.

14. A composition according to claim 1, wherein the fat of the disperse phase contains an oil soluble vitamin.

15. A composition according to claim 14, wherein the fat of the disperse phase is composed at least in part of a refined edible oil which has a distinctive flavor.

16. A composition according to claim 1, wherein the fat of the disperse phase is composed at least in part of rapeseed oil.

17. Process for preparing a plastic emulsified margarine product which comprises forming an aqueous solution of a proteinaceous protective colloid and sequestering agent for calcium ions, dispersing a normally liquid fat in said aqueous solution to form a cream, the liquid fat being present in an amount of about 30 to about 65% by weight of the cream, homogenizing said cream to obtain a particle size of 0.5 to 1.0 micron, blending said cream into a semi-solid edible fat and chilling the resulting mixture by passage through a scraped-surface heat exchanger.

18. Process according to claim 17 wherein the semi-solid fat with which the cream is blended is in partly crystallized condition.

19. Process according to claim 18, wherein the partial crystallization of the fat before blending with the cream is effected by passage through a scraped-surface heat exchanger.

20. Process according to claim 17, wherein the fat into which the cream is blended is at a temperature at which it is wholly liquid, and the cream is stabilized with casein and gelatin.

References Cited

UNITED STATES PATENTS

| 2,575,874 | 11/1951 | Herlow | 99—123 X |
| 2,787,550 | 4/1957 | Struble et al. | 99—118 |
| 1,710,403 | 4/1929 | Chamberlin | 99—123 |

OTHER REFERENCES

Andersen, A. J. C.: Margarine, 1954, Academic Press, New York, p. 141 relied on.

MAURICE W. GREENSTEIN, Primary Examiner

U.S. Cl. X.R.

99—118, 122